US008844639B2

(12) United States Patent
Gupta et al.

(10) Patent No.: US 8,844,639 B2
(45) Date of Patent: Sep. 30, 2014

(54) PENTANE-HEXANE SOLVENT IN SITU RECOVERY OF HEAVY OIL

(75) Inventors: Subodh Gupta, Calgary (CA); Simon D. Gittins, Bragg Creek (CA); Mark A. Bilozir, Calgary (CA)

(73) Assignee: FCCL Partnership, Alberta (CA)

( * ) Notice: Subject to any disclaimer, the term of this patent is extended or adjusted under 35 U.S.C. 154(b) by 230 days.

(21) Appl. No.: 13/404,293

(22) Filed: Feb. 24, 2012

(65) Prior Publication Data

US 2012/0325470 A1    Dec. 27, 2012

Related U.S. Application Data

(60) Provisional application No. 61/446,788, filed on Feb. 25, 2011.

(51) Int. Cl.
*E21B 43/24* (2006.01)
*C09K 8/592* (2006.01)

(52) U.S. Cl.
CPC ............. *E21B 43/2406* (2013.01); *C09K 8/592* (2013.01)
USPC ...................... 166/401; 166/272.4; 166/272.3

(58) Field of Classification Search
USPC ............................ 166/401, 272.4, 272.3, 267
See application file for complete search history.

(56) References Cited

U.S. PATENT DOCUMENTS

| 3,354,953 | A | 11/1967 | Morse |
| 3,439,743 | A | 4/1969 | Wyllie |
| 4,008,764 | A | * | 2/1977 | Allen ............................ 166/266 |
| 4,407,367 | A | 10/1983 | Kydd |
| 4,753,293 | A | 6/1988 | Bohn |
| 6,405,799 | B1 | 6/2002 | Vallejos et al. |
| 6,662,872 | B2 | 12/2003 | Gutek |

(Continued)

FOREIGN PATENT DOCUMENTS

| CA | 1228021 | 10/1987 |
| CA | 2594626 | 1/2009 |

OTHER PUBLICATIONS

Gupta, S., Gittins, S., and Picherack, P., Insights Into Some Key Issues With Solvent Aided Process; PanCanadian Resources, Petroleum Society Canadian Itnernational Petroleum Conference 2001 9Calgary Canada Jun. 12-14, 2001), Paper 2001-126; pp. 1 to 23 Jun. 12, 2001.

(Continued)

*Primary Examiner* — Zakiya W Bates
*Assistant Examiner* — Silvana Runyan
(74) *Attorney, Agent, or Firm* — Jackson Walker, LLP (57) ABSTRACT

An integrated thermal recovery process using a solvent of a pentane or hexane or both as an additive to, or sole component of, a gravity-dominated process for recovering bitumen or heavy oil from a reservoir. A pentane-hexane specific solvent fraction is extracted at surface from a diluent stream. That pentane-hexane solvent fraction is then injected into the reservoir as part of a gravity-dominated recovery process within the reservoir, and when that solvent fraction is subsequently produced as part of the oil or bitumen blend, it is allowed to remain within the blend to enhance the subsequent blend treating and transportation steps. Meanwhile, the remainder of the diluent from which the solvent stream had been extracted is utilized at surface as a blending stream to serve as an aid in treating of produced fluids and also to serve as a means of rendering the bitumen or heavy oil stream pipelineable.

12 Claims, 4 Drawing Sheets

(56) References Cited

U.S. PATENT DOCUMENTS

| | | | |
|---|---|---|---|
| 6,769,486 B2 | 8/2004 | Lim et al. | |
| 7,363,973 B2 | 4/2008 | Nenniger et al. | |
| 7,464,756 B2 | 12/2008 | Gates et al. | |
| 2002/0079248 A1* | 6/2002 | Kresnyak | 208/187 |
| 2003/0015458 A1* | 1/2003 | Nenniger et al. | 208/428 |
| 2003/0150801 A1* | 8/2003 | Ward et al. | 210/610 |
| 2008/0017372 A1 | 1/2008 | Gates et al. | |
| 2009/0056941 A1 | 3/2009 | Valdez | |
| 2011/0120709 A1* | 5/2011 | Nasr et al. | 166/272.3 |

OTHER PUBLICATIONS

Application to Amend Jackfish Steam Assisted Gravity Drainage Commercial Scheme, Approval #10097A to Include Solvent Injection for Improved SAGD Performance, Jan. 2010.

Expanding Solvent SAGD in Heavy Oil Reservoirs, Pradeep Anath Govind, Swapan Das, TJ Wheeler, COP, Sanjay Srinivasan, U of T at Austin, SPE, Oct. 2008.

Design of the Steam and Solvent Injection Strategy in ESSAGD, I.D. Gates, N. Chakrabarty, U of Calgary, JCPT, Sep. 2008.

Ayodele et al. (2010); Testing and History Matching ES-SAGD (Using Hexane), Paper presented at the SPE Western Regional Meeting held in Anaheim, CA USA, May 27-29, 2010.

How Fast Is Solvent Based Gravity Drainage, J.E. Nenniger, S.G. Dunn, Canadian International Petroleum Conference, Paper 2008-139 Jun. 17-19, 2008.

\* cited by examiner

PENTANE-HEXANE SOLVENT IN SITU RECOVERY OF HEAVY OIL

CROSS REFERENCE TO RELATED APPLICATIONS

This application claims the benefit of priority of U.S. Provisional Patent Application No. 61/446,788 filed Feb. 25, 2011, which is incorporated herein by reference in its entirety.

FIELD

The present disclosure relates generally to recovery of bitumen or heavy oil. More particularly, the present disclosure relates to enhancing the performance of an in situ gravity-dominated recovery process within an oil sand or heavy oil reservoir by using a pentane or hexane solvent, or mixtures thereof.

BACKGROUND

Diluent Use in Thermal Recovery
Dual Use of Diluent—Treating and Transportation

Thermal recovery of heavy oil or bitumen is well known, for example by steam assisted gravity drainage (SAGD). Steam, provided into the subterranean reservoir, heats the heavy oil or bitumen, and the mobilized heavy oil or bitumen produced.

A diluent may be used to treat the produced heavy oil or bitumen to achieve a cleaner product, for example by treating or to form a blend for transportation, for example by pipeline or both for treating and transportation. Diluent comprising lighter alkanes is commonly used for said purposes. One such diluent is a light sweet synthetic crude, for example Suncor™ Oil Sands Blend A (OSA) or Syncrude™ Synthetic Crude (SYN). Another example of a diluent is natural gas condensate (NGC).

Diluent for Treating—Interaction with Produced Non-Condensable Gas (PG)

Typically, heavy oil and bitumen in a reservoir have some dissolved gas (primarily methane), which is evolved or liberated from solution during the process of oil recovery. Additional non-condensable gases may be generated within the reservoir, for example as a result of thermal recovery processes. At surface the presence of these gases results in vaporization of the lighter fractions of the diluent which is added to assist with emulsion separation. This gaseous phase is then separated from the liquids containing lighter fractions of diluent with the help of surface facilities such as air coolers and separators, as shown for example in FIG. 1.

Diluent for Transportation—Recovery from Blend Tanks

Figure 1:
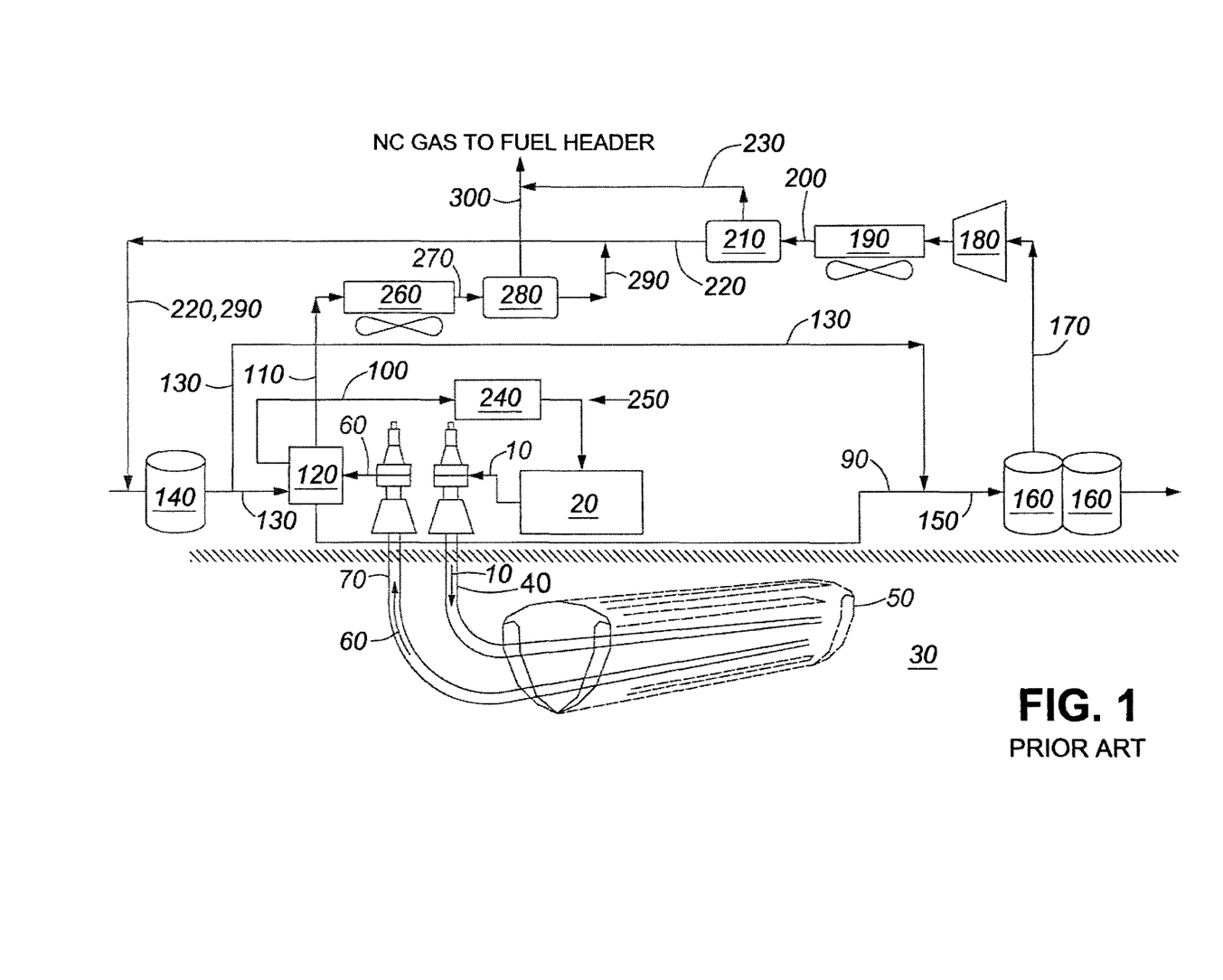
FIG. 1 is a simplified schematic of prior art based on a SAGD embodiment.

Typically, some portion of diluent from the tanks (vessels) provided for mixing the produced heavy oil or bitumen with diluent for meeting transport (e.g., pipeline) specifications flashes into vapors which is then compressed, cooled and separated into non-condensable gas and liquid hydrocarbons. Non-condensable gas then mixes with the other streams of non-condensable gas (PG) and is diverted to the fuel header, and the liquid hydrocarbons are diverted to the diluent tank, for example as shown in FIG. 1.

Solvent Use in Thermal Recovery

Various lighter hydrocarbon fractions have been used within a heavy oil or oil sands reservoir either to constitute the basis for a reservoir recovery process (i.e. used substantially alone) or to enhance the performance of an existing reservoir recovery process (e.g. used with, for example, steam).

Lighter hydrocarbons have been injected (without steam) with the aim of diluting and thereby mobilizing the heavy oil or bitumen, and ultimately recovering it using a gravity-dominated process, such as VAPEX™.

Lighter hydrocarbon fractions have also been used (with steam) to enhance the performance of steam-based reservoir recovery processes, including not only gravity-dominated processes, such as SAGD, but also those which are not gravity-dominated, such as Cyclic Steam Stimulation (CSS).

One reservoir recovery process known as Solvent Aided Process (SAP) involves use of lighter alkanes, such as propane or butane (indiscriminately chosen without specification of alkanes) with steam. Authors Gupta and Gittins have described a SAP process in a number of publications.

However, none of these solvent-based or solvent-aided processes provides concurrently both enhanced recovery (such as higher recovery efficiencies, lower SOR, or higher recovery factor) of heavy oil or bitumen from a reservoir and more efficient surface processing of the light hydrocarbon fraction that plays a role in achieving those enhanced levels of recovery from the reservoir.

In reservoir recovery processes where no solvents are injected, the non-condensable gas stream from the emulsion treating vessel, after cooling and separation, primarily contains only methane. However, when lighter solvents are used, this non-condensable gas stream is rich in those lighter solvents. Specifically, when lighter solvents such as C3 or C4 are used in conjunction with steam for enhancing performance of the oil recovery process from the reservoir, a large portion of these light solvents are mainly vaporized by the PG. Therefore in order to salvage the higher value in these light solvents, this stream needs to be processed in a 'solvent recovery facility' which separates the non-condensable gas from the liquid solvents, as shown for example in FIG. 2. The entire PG+solvent mixture is typically not used for re-injection into the reservoir, as the presence of the non-condensable gas compromises the miscibility of the solvent with oil in the reservoir.

SUMMARY

It is an object of the present disclosure to obviate or mitigate at least one disadvantage of previous methods for recovery of heavy oil or bitumen using a solvent.

This disclosure relates to a method of recovering heavy oil or bitumen from a petroleum reservoir using a gravity-dominated reservoir recovery process such as, but not limited to, SAGD. The method involves the use of a select solvent fraction, either alone or in conjunction with thermal means such as, but not limited to, steam. This disclosure, through its specific selection of solvent fraction, utilizes a feature which integrates the surface processing and reservoir processes to provide improved recovery efficiency and economics.

The enhancements and improvements are attained by using a specified fraction of lighter hydrocarbons in a manner which improves performance of the recovery process within the reservoir and, by means of an integrated approach involving both surface and subsurface processes, which concurrently achieves increased efficiencies associated with the surface processing and disposition of the injected and produced hydrocarbon fluids when compared with prior technology.

Commonly, having regard to present practices, the referenced gravity-dominated recovery process within the reservoir would be thermal in nature. Of the possible thermal recovery processes, most commonly the referenced gravity-dominated reservoir recovery process would include steam injection. Commonly, the steam injection recovery process within the reservoir would be Steam Assisted Gravity Drainage (SAGD).

The method described in this disclosure employs the petroleum fraction consisting principally of pentanes and hexanes, (also referred to as SynSolve or Synthetic Solvent or pentane-hexane solvent for convenience in this document) most commonly in conjunction with gravity-dominated thermal reservoir recovery processes, such as SAGD, to achieve enhanced levels of recovery efficiency, relative to SAGD without solvent.

The enhanced levels of recovery efficiency achieved as described in this disclosure are comparable to those attained with lighter alkane fractions, such as those employed in the Solvent Aided Process (SAP) described by Gupta and Gittins (e.g. propane and butane) in Gupta, S., Gittins, S, and Picherack, P., *Insights Into Some Key Issues With Solvent Aided Process*; PanCanadian Resources, Petroleum Society Canadian international Petroleum Conference 2001 (Calgary Canada Jun. 12-14, 2001), Paper 2001-126; pages 1 to 23. However, in the process of the present disclosure the selected solvent fraction may be more readily produced back to surface, not requiring separation from the oil and may be readily separated from the non-condensable PG without requiring an elaborate solvent recovery facility, and may be readily captured for additional uses or re-use as solvent (e.g. forming a substantially closed loop solvent process).

This disclosure relates to a reservoir recovery process aspect of the operation that is integrated with a surface processing aspect of the operation such that the combined aspects of the operation are rendered more efficient overall.

The integration of reservoir and surface processing/transportation functions, is realized in the context of thermal, and specifically steam-based, gravity-dominated recovery processes. However, this disclosure also provides an additional, secondary benefit, in that it provides a means of overcoming or reducing problems associated with certain reservoir gravity-dominated recovery techniques that are non-thermal or minimally thermal in nature. Specifically, it is known from field experience that the effectiveness of non-thermal gravity-dominated reservoir recovery processes, such as VAPEX™, can be compromised or negated by the spontaneous formation of natural gas hydrates (clathrates) that can plug the pores within the reservoir.

In the event that a non-thermal or minimally thermal reservoir recovery process is utilized, this disclosure provides an environment for interaction of indigenous and injected fluids whereby this plugging tendency due to clathrate formation is reduced. Specifically, in the method of this disclosure, the utilization of an alkane or alkane mixture with a higher average carbon number than that of lighter alkanes such as propane or butane, or mixtures thereof, reduces the tendency to form clathrates at a given pressure and temperature.

This disclosure relates to a method of recovering heavy oil or bitumen from a petroleum reservoir using a gravity-dominated reservoir recovery process such as, but not limited to, SAGD. The method involves the use of a solvent fraction, either alone or in conjunction with thermal means such as, but not limited to, steam. The specific selection of solvent fraction, utilizes a feature which integrates the surface and reservoir processes in a manner which is efficient and which is not identified or implied in the prior art.

This disclosure involves, in one aspect, the surface extraction of the fraction of alkanes consisting of pentanes and hexanes (both normal and isomers) from imported or otherwise available diluent. Diluent is a generally costly commodity so that, in this disclosure, the remainder of the diluent (Abridged Diluent), after removal of the pentanes and hexanes, can then be utilized as appropriate on site or can be marketed. For example, the Abridged Diluent can be used on site as blending material in the produced oil-water emulsion treating process, or as blending material for oil pipelining, or both.

This disclosure involves, in one aspect, the process whereby the pentane-hexane fraction extracted from the diluent is injected into the reservoir as part of a gravity-dominated recovery process. When used in conjunction with steam, at pressure and temperature levels characterized by steam saturation conditions before injection of solvent, the pentane-hexane solvent will perform within the reservoir similarly to its lighter alkane counterparts, such as propane and butane in that the pentane-hexane solvent fraction will vaporize and travel to the vapor-oil interface and condense there and mobilize heavy oil or bitumen. The pentane-hexane solvent, having mobilized additional bitumen or heavy oil, thereby will improve recovery process performance within the reservoir compared with that of SAGD alone. In particular, when used in conjunction with a steam-based gravity-dominated reservoir recovery process, such as SAGD, the pentane-hexane solvent will also reduce steam-oil ratio.

This disclosure involves, in one aspect, the produced bitumen or heavy oil, now blended with a major portion of the SynSolve fraction that had been injected into the reservoir. That is, a substantial portion of the injected pentane-hexane fraction or SynSolve will be produced back to surface with the bitumen or heavy oil, and of that produced SynSolve, a major portion will not be separated or fractionated into bitumen and pentane-hexane fractions, for example with the intent of re-using the latter.

Instead, the produced bitumen-pentane-hexane blend will remain intact as a produced hydrocarbon stream, and will undergo surface treatment and will be transported to markets, for example by pipeline. However, given the ongoing presence of the pentane-hexane fraction in the produced bitumen blend, the need for additional whole diluent for the purposes of surface treatment or transportation will be correspondingly reduced, because the produced bitumen already contains an amount of pentane-hexane. That portion of the produced SynSolve stream which does not remain as part of the produced bitumen blend will vaporize with PG in the produced fluids treating vessel(s), whereupon it can be separated from PG after cooling and separation (as shown for example in FIG. 3.). This separation of the SynSolve fraction from PG is much more easily accomplished when the solvent consists of the pentane-hexane fraction as compared to the use of lighter solvents, which require an additional, much more elaborate, facility for separation of solvent from PG.

Alternatively, if the produced bitumen-pentane-hexane blend is mixed with the Abridged Diluent, then the diluent will have been made substantially whole in terms of the original range of its components. Accordingly, the pentane-hexane fraction initially extracted from the diluent will serve in a dual role as a reservoir performance enhancement agent and subsequently, by remaining in the produced blend, as a means of enhancing the bitumen or heavy oil treating and transportation processes.

Thus, the process encompassed within this disclosure can be viewed by comparison with, and in contrast to, the well established practice of adding whole diluent to a produced bitumen blend.

In this disclosure, the whole diluent is first processed so that a substantial portion of the pentanes and hexanes are removed, leaving a diluent which is thus substantially deficient in pentanes and hexanes (Abridged Diluent). Those pentanes and hexanes are diverted into the reservoir to enhance recovery process performance, and the bitumen blend with associated pentanes and hexanes is produced, and is there mixed with the Abridged Diluent, so that the range of components within the diluent is effectively substantially restored.

It is a feature of the disclosed method, when used in a thermal reservoir recovery process, that the pentane-hexane fraction is initially a vapor within the reservoir and, upon contacting the oil-vapor or bitumen-vapor interface within the steam or heated chamber in the reservoir, largely condenses. That is, the hot vapor condenses as it contacts a sufficiently cold region, at reservoir pressure. In so liquefying, the major portion of the pentane-hexane fraction will blend with the bitumen or heavy oil and will aid in its mobilization. The pentane-hexane fraction is more miscible in the oil than lighter alkanes, such as butane and propane, which represents an advantage of the pentane-hexane fraction as a reservoir solvent. Furthermore, components heavier than hexane, i.e. having seven or more carbon atoms, will precipitate out more readily in the vicinity of the injection well and as such will be correspondingly less effective in influencing the action at the bitumen-vapor interface and therefore in enhancing performance. The blend of SynSolve and bitumen or heavy oil and condensed steam (water) will then be produced to the surface. In an embodiment of this disclosure, the reservoir is at a steam saturation condition at the injector well, prior to solvent co-injection. After that saturated or super heated steam with solvent (at any pressure allowable by reservoir containment considerations) is then injected, typically any time after a start-up period which typically is less than six months.

The miscibility of the pentane-hexane fraction with the heavy oil or bitumen in the reservoir, and its production to the surface with the heavy oil or bitumen as part of a hydrocarbon liquid blend, stands in contrast to the behavior of a solvent consisting of a lighter alkane, such as butane. When, for example, butane is used as the hydrocarbon solvent in the reservoir, it is subsequently produced as part of the gas phase (i.e., mixed with PG). As the produced butane is thus part of a gaseous mixture, it must be either burned for fuel or separated from the remainder of the gas phase for re-use or to otherwise reclaim its value. Each of these alternatives is costly.

In contrast to this, the disclosed method ensures that the pentane-hexane fraction is produced preponderantly as part of the hydrocarbon liquid stream rather than in gaseous form, thereby conferring an immediate benefit in terms of subsequent surface treating and pipelining and, as a further benefit, obviating the need to separate out the pentane-hexane fraction from the produced hydrocarbon liquid.

The disclosed method is less dependent on variations of pressure and temperature, and inasmuch as the disclosed method does not require special or extraordinary temperature and pressure controls, is more robust.

This disclosure teaches a process whereby imported or available diluent is first fractionated to extract the pentane-hexane fraction. The extracted pentane-hexane fraction then serves as a solvent in the reservoir recovery process, and subsequently as a diluent in and throughout the surface processes, including treating and blending. When the resulting hydrocarbon-pentane-hexane-water blend is produced, there is no need to extract the pentane-hexane fraction for re-use, since its continued residence within the produced blend serves a timely and useful purpose in the course of both treating and transporting the produced hydrocarbons. Accordingly, the entire produced hydrocarbon blend can be directed to market without any need for recovery of the pentane-hexane fraction.

When fractions lighter than pentane (e.g. C3, C4) are used as solvent, an expensive surface facility is needed to salvage its value and to separate it from produced fluids and gases for the purpose of reuse and recycle. When fractions heavier than hexane (such as C7, C8, C9 etc.) are used as solvent, they are nor as effective in enhancing the oil recovery process, inasmuch as they precipitate out in the near well vicinity and thus are not generally effective in mobilizing the oil further out from the well at the vapor-liquid interface. In contrast, SynSolve not only is effective in enhancing the oil recovery process within the reservoir, but is also more efficient in its surface processing features inasmuch as it does not require expensive equipment. This integration of functions into one overall solvent-based process that achieves greater efficiencies in both its reservoir and surface aspects represents a key teaching of this method, process, and system.

Particulars regarding the use of solvents generally as a supplement to gravity-dominated thermal recovery techniques in oil sands and heavy oil are reported in the public domain. Therefore, it will be apparent to one skilled in the art that specific details regarding solvent injection into the reservoir are not required in order to practice the disclosed method. Analogously, the extraction of the pentane-hexane fraction from a diluent stream involves standard techniques and requires no further elaboration in order to allow one skilled in the art to practice the techniques of this disclosure.

The integration of surface and reservoir processes as taught in this disclosure involves the following basic elements. A portion of the diluent that is imported or purchased or otherwise received is subjected to a relatively low-cost fractionation or otherwise separated to provide the selected fraction comprising substantially pentanes and hexanes.

In a variation of this disclosure, instead of using a fractionation facility to separate the whole diluent into SynSolve and Abridged Diluent, one may utilize an approach whereby this SynSolve is generated within the typically existing SAGD facilities. The hydrocarbon vapors extracted from the diluent-bitumen blending tanks are compressed, cooled and separated into non-condensable gas and hydrocarbon liquids. This hydrocarbon liquid is rich in SynSolve and is then used as a solvent in the reservoir recovery process with an effectiveness comparable to lighter alkanes, such as propane or butane. This is shown for example in FIG. 4. The added advantage of this variation is that no new fractionation facility is required.

That is, within the range of temperatures and pressures typically employed in SAGD and related solvent-assisted gravity-dominated recovery processes, the pentane-hexane fraction will make broad contact as a vapor within the heated chamber, will condense to liquid form and thence mobilize bitumen at the walls of the chamber and will drain as a liquid with the bitumen to the producer (production well). Thus, the heavy oil or bitumen thereby produced will contain in liquid form most of the pentane-hexane fraction. This fraction will thus serve as an inherent diluent, to which other diluent may be added at the surface as needed to facilitate treating of the produced stream and to render the bitumen or heavy oil blend suitable for transportation and marketing.

Given that, as described in this disclosure, the pentane-hexane fraction is initially derived from the available or imported diluent, and that upon being produced the pentane-hexane fraction then serves a useful function in the treatment and transportation of the bitumen or heavy oil, there is accordingly no need to recover the pentane-hexane fraction from the produced bitumen or heavy oil. In this respect the techniques disclosed differ materially from other recovery processes involving lighter solvents, such as butane, wherein a special surface process must be introduced to strip and reclaim the solvent from the produced fluid stream.

Furthermore, the integration of surface and reservoir processes, as disclosed, and the absence of any need to recover the pentane-hexane fraction from the produced fluid stream, contrasts with reservoir recovery processes described in the prior art that use lighter alkanes, such as propane or butane. These lighter alkanes, after having contacted the bitumen in the reservoir, experience a phase separation in which a larger quantity of the lighter alkanes remains in the gaseous phase than is the case when the pentane-hexane fraction is employed, as in this disclosure. Accordingly, whereas the pentane-hexane fraction employed in the present disclosure tends to be present more in liquid form in the produced bitumen blend, the lighter alkanes, such as propane and/or butane, employed in prior art processes, are produced largely in the gaseous phase, and therefore exit the producer well mixed with the other produced gases. Because of miscibility issues, the produced gas containing the lighter alkanes cannot be re-cycled unmodified into the reservoir in order to once again take advantage of its alkane components.

Therefore, with respect to the prior art, where lighter alkanes are used as the assisting solvent, and inasmuch as the lighter alkanes are produced largely in the gaseous phase, and also given the value of these produced lighter alkanes, there is a need when practicing the prior art to either send the produced gas and associated solvent to boilers (i.e. burn it as fuel gas, which tends to be uneconomic), so that the heating value of the lighter alkanes can be salvaged, or to separate out the lighter alkanes from the produced gas for re-cycling into the reservoir. The latter option is usually employed in prior art field practice. However, either way, when the prior art is practiced, the net value of the produced lighter alkanes is diminished.

Thus, this disclosure describes the integration of firstly a surface extraction process which generates the specific solvent fraction from a source diluent stream and secondly a recovery process within the reservoir which uses that specific solvent fraction to advance or enhance performance efficiency without the need to recover subsequently the specific solvent fraction from the produced hydrocarbon stream. That is, in the method, process, and system described in this disclosure, there is no need to separate the solvent from the produced oil. And, to the extent that some of the produced solvent will be in vapor form within the produced gas (PG), it will be separated from the PG in the existing facility.

In a first aspect, the present disclosure provides a method of recovering heavy oil or bitumen from a reservoir under a gravity-dominated recovery process including providing a pentane-hexane solvent, injecting the pentane-hexane solvent into the reservoir as part of the gravity-dominated recovery process, and producing heavy oil or bitumen and recovered liquid pentane-hexane solvent from the reservoir.

In an embodiment disclosed, the pentane-hexane solvent is injected with steam.

In an embodiment disclosed, the pentane-hexane solvent is greater than 25 percent pentane or hexane or mixtures thereof. In an embodiment disclosed, the pentane-hexane solvent is greater than 50 percent pentane or hexane or mixtures thereof. In an embodiment disclosed, the pentane-hexane solvent is greater than 80 percent pentane or hexane or mixtures thereof. In an embodiment disclosed, the pentane-hexane solvent is greater than 90 percent pentane or hexane or mixtures thereof.

In an embodiment disclosed, at least 25 percent of the injected pentane or hexane or mixtures thereof is recovered in the heavy oil or bitumen and recovered liquid pentane-hexane solvent. In an embodiment disclosed, at least 50 percent of the injected pentane or hexane or mixtures thereof is recovered in the heavy oil or bitumen and recovered liquid pentane-hexane solvent. In an embodiment disclosed, at least 80 percent of the injected pentane or hexane or mixtures thereof is recovered in the heavy oil or bitumen and recovered liquid pentane-hexane solvent. In an embodiment disclosed, at least 90 percent of the injected pentane or hexane or mixtures thereof is recovered in the heavy oil or bitumen and recovered liquid pentane-hexane solvent.

In an embodiment disclosed, the produced heavy oil or bitumen and the recovered liquid pentane-hexane are mixed with a diluent.

In an embodiment disclosed, the pentane-hexane solvent is between 2 wt % and 20 wt % of the steam.

In an embodiment disclosed, a diluent comprising pentane-hexane is separated into a pentane-hexane fraction to provide the pentane-hexane solvent, and an abridged diluent fraction. In an embodiment disclosed, the separation is by fractionating. In an embodiment disclosed, the fractionating provides a light ends fraction. In an embodiment disclosed, the fractionating provides a heavy ends fraction. In an embodiment disclosed, the light ends fraction and the pentane-hexane fraction are combined to provide the pentane-hexane solvent.

In an embodiment disclosed, the abridged diluent and the produced heavy oil or bitumen are combined to provide a blended oil.

In an embodiment disclosed, hydrocarbons containing substantially pentanes and hexanes are collected from the heavy oil or bitumen to provide the pentane-hexane solvent. In an embodiment disclosed, the hydrocarbons are collected from a blended oil tank, containing heavy oil or bitumen. In an embodiment disclosed, the hydrocarbons are collected from an emulsion treater.

In a further aspect, the present disclosure provides an integrated solvent aided thermal recovery system including an alkane separation unit adapted to receive an alkane diluent and separate the alkane diluent to provide a pentane-hexane solvent and an abridged diluent fraction, an injection unit for providing the pentane-hexane solvent to an oil sand reservoir, a production until for producing fluids from the oil sand reservoir, the produced fluids including heavy oil or bitumen and substantially the pentane-hexane solvent, a treating unit adapted to receive the produced fluids and a first portion of the abridged diluent fraction to provide a diluted bitumen blend, and a blending unit, adapted to receive the diluted bitumen blend from the treating unit, and a second portion of the abridged diluent fraction for combination to provide a blended oil for shipment.

In an embodiment disclosed, the injection unit is adapted to provide steam to the oil sand reservoir with the pentane-hexane solvent.

In a further aspect, the present disclosure provides an integrated solvent aided thermal recovery system including an injection unit for providing a pentane-hexane solvent to an oil sand reservoir, a production until for producing fluids from the oil sand reservoir, the produced fluids including heavy oil or bitumen and substantially the pentane-hexane solvent, a treating unit adapted to receive the produced fluids and a first portion of a diluent to provide a diluted bitumen blend, a blending unit, adapted to receive the diluted bitumen blend from the treating unit, and a second portion of the diluent for combination to provide a blended oil for shipment, and a vapor recovery unit adapted to receive vapors containing pentane-hexane from the blending unit or the production unit, or both, and condensing the pentane-hexane to provide the pentane-hexane solvent.

In an embodiment disclosed, the injection unit is adapted to provide steam to the oil sand reservoir with the pentane-hexane solvent.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method and system for recovery of heavy oil or bitumen from an oil sand using a selected solvent fraction within a recovery process integrated with a treatment process or a transportation process or both.

Steam Assisted Gravity Drainage (SAGD)

FIG. 1 illustrates one embodiment of a prior art steam assisted gravity drainage (SAGD) type operation. Steam 10 from a steam generator 20 is injected into an oil sand reservoir 30 through an injector well 40. Heavy oil or bitumen 90 within the reservoir 30 is mobilized within a steam chamber 50. Produced fluids 60, including heavy oil or bitumen, water, and non-condensable gas are produced via a producer well 70.

The produced fluids 60 are treated, including the separation of heavy oil or bitumen 90, water 100, and produced gas (PG) 110 in an emulsion treater 120. A diluent 130, from a diluent tank 140 may be added to facilitate oil-water separation in the emulsion treater 120, or added to the heavy oil or bitumen 90 to provide blended oil 150 to meet pipeline specifications, or both. The blended oil 150 may be stored in blended oil tanks 160. Vapor recovery vapors 170 from the blended oil tanks 160 are recovered via a vapor recovery compressor 180 and a vapor recovery cooler 190 to provide cooled vapor recovery vapors 200. The cooling may include condensation of at least a portion of the vapor recovery vapors 170. A vapor recovery separator 210 separates the cooled vapor recovery vapors 200 into vapor recovery liquids 220 which are sent to the diluent tank 140, and vapor recovery vapors 230.

The water 100 is treated through water treatment 240, makeup water 250 added, and provided to steam generator 20 to create steam 10 for injection.

The PG 110 passes through PG cooler 260 to provide cooled PG 270. A PG separator 280 separates the cooled PG 270 into PG liquids 290 which are sent to the diluent tank 140, and PG vapors 300.

Solvent Aided Process (SAP)

Figure 2:
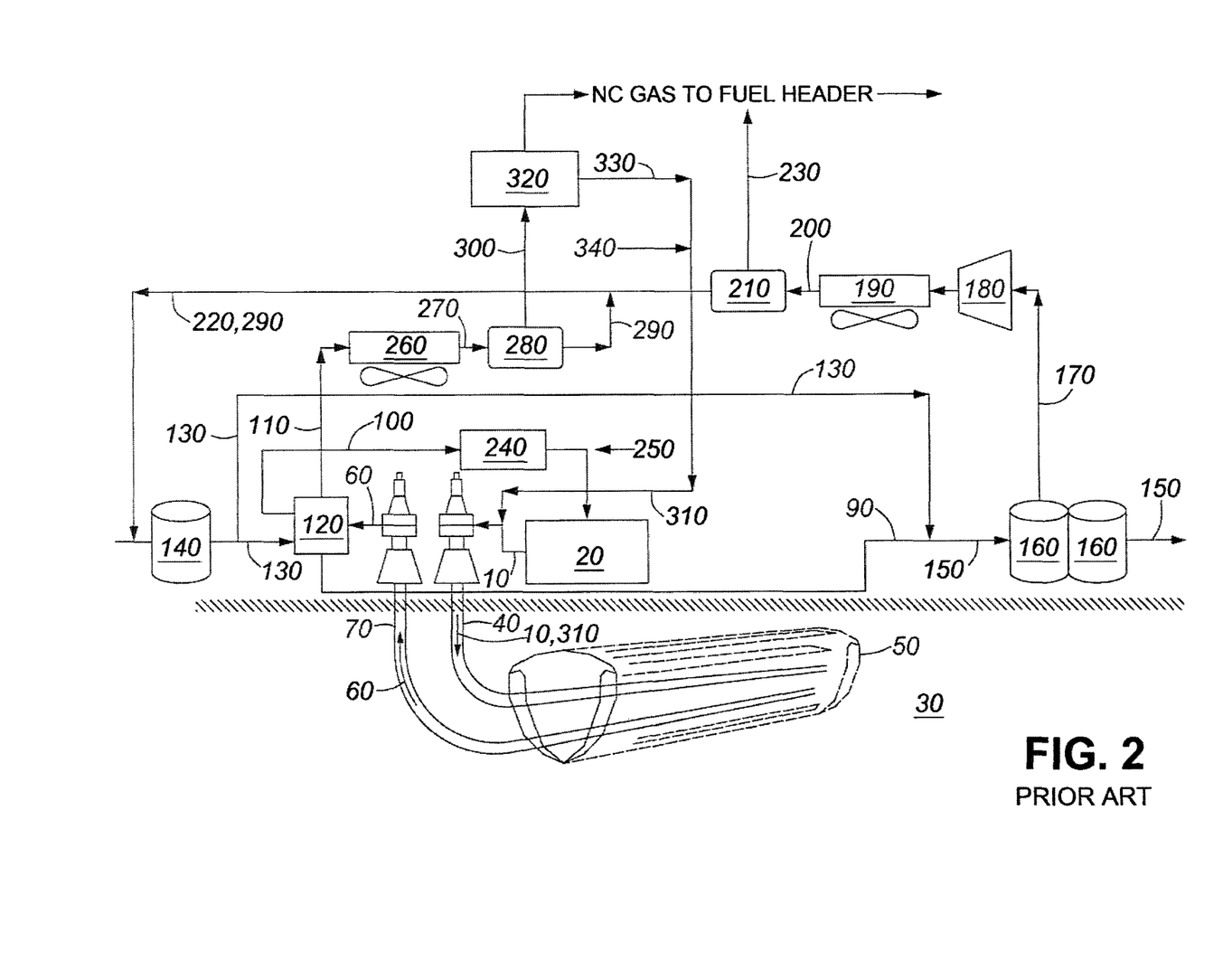
FIG. 2 is a simplified schematic of prior art based on a SAP embodiment.

FIG. 2 illustrates one embodiment of a prior art solvent aided process (SAP) type operation using a SAGD configuration as in FIG. 1, with the addition of light alkane solvent 310, solvent recovery unit 320, recycled solvent 330, and makeup solvent 340.

A light alkane solvent 310, for example a C3 or a C4 solvent or mixtures thereof are injected, along with the steam 10, into the oil sand reservoir 30 through an injector well 40. Produced fluids 60, including heavy oil or bitumen, water, solvent and non-condensable gas are produced via a producer well 70.

The produced fluids 60 are treated, including the separation of the heavy oil or bitumen 90, water 100, and produced gas 110 in the emulsion treater 120. At this point, recoverable light alkane solvent 310 remains in a vapor phase, with the produced gas 110. The PG vapors 300, including the recoverable light alkane solvent 310, are sent to a solvent recovery unit 320 where recycled solvent 330 is recovered and PG vapors 300 separated. Makeup solvent 340 is added, as necessary, to the recycled solvent 330 to provide light alkane solvent 310 which is injected with steam 10.

The solvent recovery unit 320 requires significant capital expenditure to design, construct, and operate in order to separate and recover the light alkane solvent 310. The solvent recovery unit 320 may include gas processing facilities to separate the C3 and C4 and the remaining vapor containing mainly PG vapors 300. The gas processing facilities required are known to one skilled in the art.

SynSolve

Figure 3:
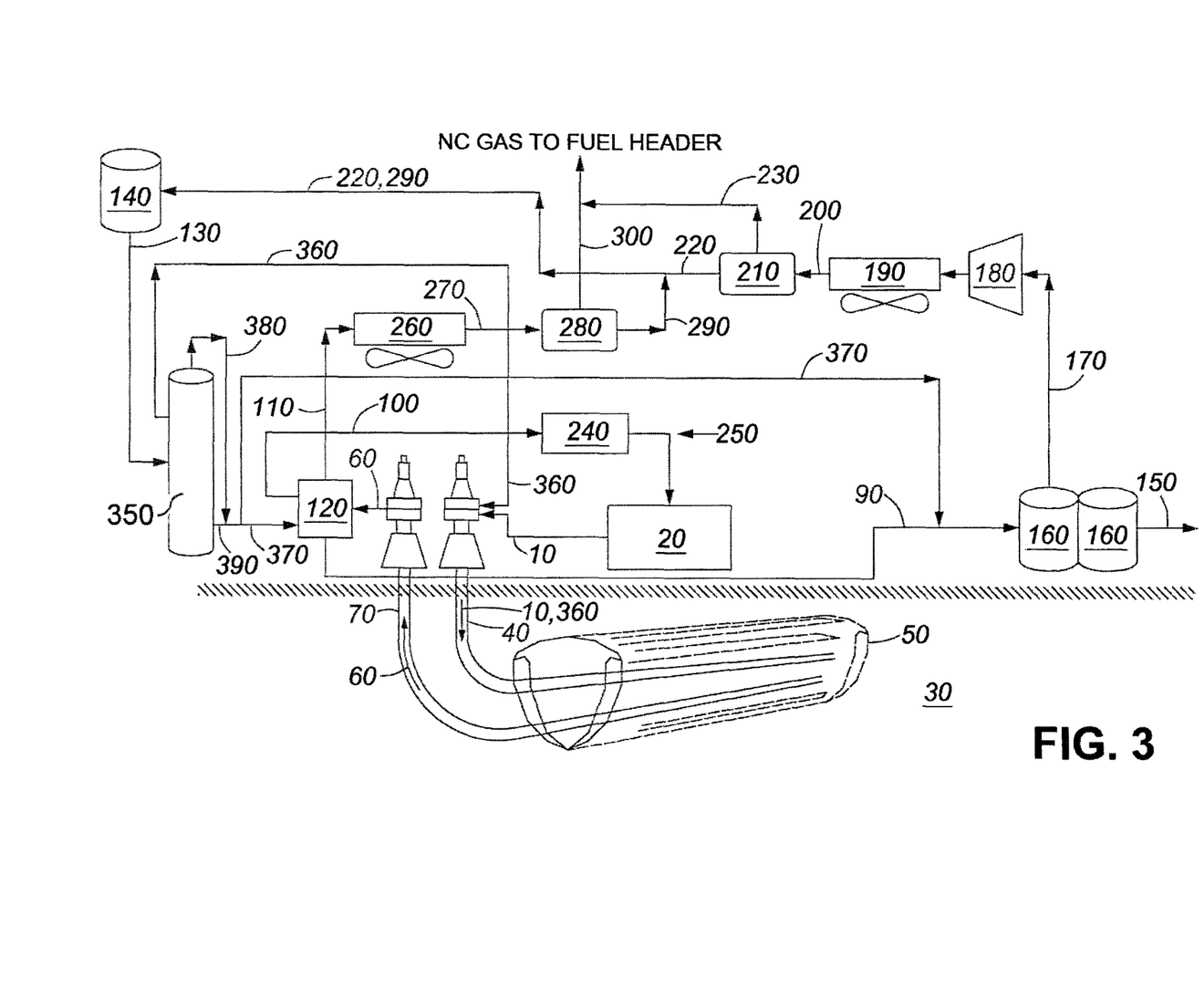
FIG. 3 is a simplified schematic of an embodiment of the present disclosure.

FIG. 3 illustrates an embodiment of the presently disclosed pentane-hexane type operation.

Referring to FIG. 3, an imported or otherwise available diluent 130 containing at least alkanes having 5 carbon atoms or 6 carbon atoms, or both, but more typically a spectrum of alkanes, including alkanes having 5 carbon atoms and alkanes having 6 carbon atoms is routed to a fractionating unit 350.

Within the fractionating unit 350, the pentane and hexane fraction, as pentane-hexane solvent 360 and the remainder of the diluent, as abridged diluent 370 are separated. In this embodiment, two other streams are provided within fractionating unit 350. Light ends 380 consist of C4− (i.e. C4 and lower) and heavy ends 390 consist of C7+ (i.e. C7 and higher). In this embodiment, the light ends 380 and the heavy ends 390 are combined to provide the abridged diluent 370.

Alternatively, the light ends 380 may combine with the pentane-hexane solvent 360. In another embodiment, the light ends 380 remain with the pentane-hexane solvent 360, for example where the light ends 380 constitute a minor quantity, or a less selective separation process is used. In an embodiment disclosed, the diluent 130 is separated into a pentane-hexane solvent 360, comprising pentanes, hexanes and minor quantities of C4, and an abridged diluent 370 comprising C7+.

In an embodiment of the present disclosure, the pentane-hexane solvent 360 includes alkanes having less than seven carbon atoms.

The pentane-hexane solvent 360 is injected into the oil sand reservoir 30 with steam 10 through an injector well 40. In an embodiment disclosed, the pentane-hexane solvent 360 is between about 1 percent and about 20 percent by weight of the mixture of steam 10 and the pentane-hexane solvent 360.

The pentane-hexane solvent 360 is a vapor within the oil sand reservoir 30, and upon contacting the bitumen-vapor interface within the heated chamber 50 in the oil sand reservoir 30, largely condenses. In so liquefying, a substantial portion or substantially all of the pentane-hexane solvent 360 and steam 10 blends with the heavy oil or bitumen 90 and aids in its mobilization.

Produced fluids 60, including heavy oil or bitumen, water, pentane-hexane solvent, and non-condensable gas are produced via a producer well 70, A substantial portion of the pentane-hexane solvent 360 injected, is produced back to surface, in the liquid phase, particularly in the bitumen or heavy oil 90 produced.

The produced fluids 60 are treated, including the separation of the oil, produced water, and produced gas. The abridged diluent 370 may be added to emulsion treater 120 to facilitate oil-water separation, or added to the heavy oil or bitumen 90 to provide blended oil 150 to meet pipeline specifications, or both. Alternatively, fresh diluent 130 can be used for these purposes.

Internally Recycled SynSolve

Figure 4:
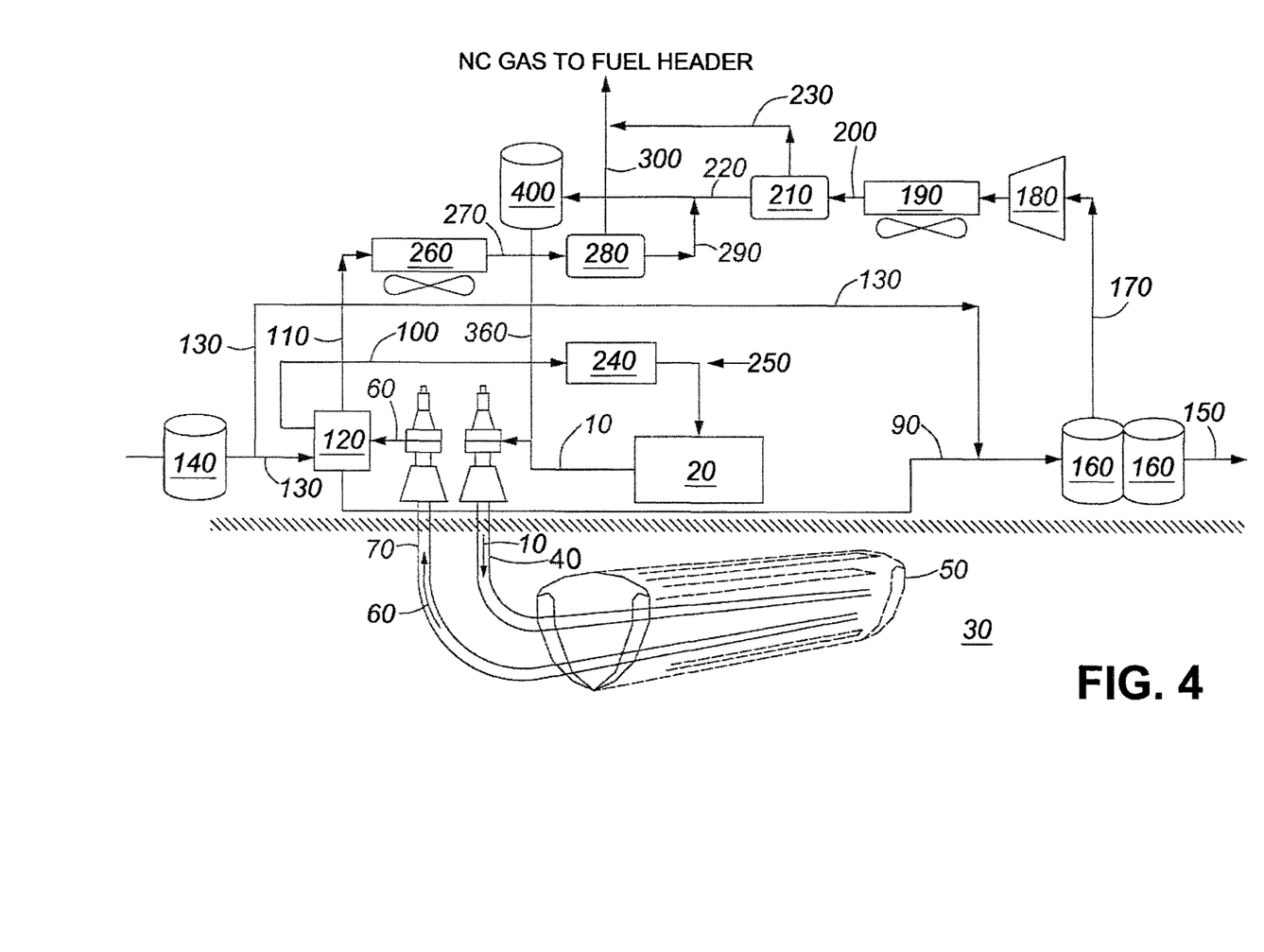
FIG. 4 is a simplified schematic of an embodiment of the present disclosure.

FIG. 4 illustrates one embodiment of the present disclosure where pentane-hexane solvent 360 is internally recycled.

The vapor recovery vapors 170, recovered from the blended oil tanks 160 predominantly contain pentane-hexane. The Vapor recovery vapors 170 from blended oil tanks 160 are recovered via a vapor recovery compressor 180 and a vapor recovery cooler 190 to provide cooled vapor recovery vapors 200. At least a portion of the vapor recovery vapors 170 condense. A vapor recovery separator 210 separates the cooled vapor recovery vapors 200 into vapor recovery liquids 220 which are sent to the pentane-hexane solvent tank 400, and vapor recovery vapors 230. The vapor recovery liquids 220 are substantially pentane-hexane. The vapor recovery vapors 230 include alkanes having four or less carbon atoms.

Similarly, the produced gas 110, from the emulsion treater 120, may include some pentane-hexane. The produced gas 110 from the emulsion treater 120 is cooled through the cooler 260 to provide cooled PG 270. The PG separator 280 is used to separate out the PG liquids 290 and PG vapors 300. The PG liquids 290 are sent to the pentane-hexane solvent tank 400.

Liquid hydrocarbons containing predominantly pentane-hexane from the pentane-hexane solvent tank 400 are injected into the reservoir 30 as pentane-hexane solvent 360 with steam 10 through an injector well 40. In this embodiment, no fractionation unit 350 (as in FIG. 3) for fractionating diluent into a pentane-hexane fraction and abridged diluent 370 is required. Instead, the pentane-hexane solvent 360 is provided by collecting and recovering pentane and hexane vapors from, for example the blended oil tank 160 and the PG separator 280.

Produced fluids 60, including heavy oil or bitumen, water, and non-condensable gas are produced via a producer well 70. The produced fluids 60 are treated, including the separation of the oil, water, and produced gas. The diluent 130 may be added to emulsion treater 120 to facilitate oil-water separation, or added to the heavy oil or bitumen 90 to provide blended oil 150 to meet pipeline specifications, or both. In this embodiment, the heavy oil or bitumen 90 is rich in pentane-hexane, as a significant portion of the pentane-hexane solvent 360 injected is produced back with the produced fluids 60.

Vapors are recovered from the produced fluids 60, including from the emulsion treater 120 and processing or storage tanks or pressure vessels, for example including the blended oil tank 160.

In an embodiment of this disclosure, vapors containing pentane-hexane, such as the vapor recovery vapors 170 or the produced gas 110 or both may be cooled, or pressure adjusted, or a combination thereof, such that the pentane-hexane components substantially condense, while lighter hydrocarbons do not.

In an embodiment disclosed, the heavy oil or bitumen 90 or the blended oil 150 or both may be heated, or pressure adjusted, or a combination thereof, such that the pentane-hexane components substantially evaporate, while heavier hydrocarbons do not.

In an embodiment disclosed, the heavy oil or bitumen 90 or the blended oil 150 or both is stored in an atmospheric storage tank at between about 40 degrees Celsius and 50 degrees Celsius or above, for example in blended oil tank 160, prior to shipment by pipeline. At such conditions, the lighter alkanes including pentanes and hexanes vaporize (for example by evaporation).

Residence time, heat, agitation, or combinations thereof, may be added to increase the amount of pentanes and hexanes that exist in vapor phase, to increase the recovery of the pentanes and hexanes for recycle (for example at the blended oil tank 160).

In an embodiment disclosed, the pentane-hexane fraction is recovered as vapor from various treating and storage equipment, cooled or chilled to form a liquid pentane-hexane, and pumped up to a suitable pressure for reinjection with steam 10 into the reservoir 30 as pentane-hexane solvent 360.

In an embodiment disclosed, significant portion of the pentane-hexane solvent 360 that is injected is recovered back and may be readily separated from the heavy oil or bitumen 90, or may remain in the heavy oil or bitumen 90 which results in less diluent required prior to shipment by pipeline.

Pentane, as used herein, includes n-pentane or i-pentane or mixtures thereof.

Hexane, as used herein, includes n-hexane or i-hexane or mixtures thereof.

Heavy oil or bitumen, as used herein, includes hydrocarbons falling within the definition of heavy oil and includes the subset of heavy oil, known as bitumen.

Pentane-hexane, as used herein, includes pentane or hexane or mixtures thereof.

In an embodiment disclosed, the reservoir or heated chamber or steam chamber, as the case may be, is operated at a temperature and pressure which is below the boiling point or the bubble point, as the case may be, of the pentane-hexane solvent, such that the pentane-hexane solvent is condensable or condensed, and therefore recoverable from the reservoir in a substantially liquid form at reservoir pressure and temperature.

In an embodiment disclosed, one or more of the produced fluids 60, producer well 70, emulsion treater 120, vapor recovery cooler 190, cooled vapor recovery vapors 200, vapor recovery separator 210, and the blended oil tanks 160, are adapted to operate at a pressure and temperature such that the pentane-hexane solvent is below the boiling point or the bubble point, as the case may be.

However, in an embodiment disclosed, one or more of the blended oil tanks 160 or vapor recovery compressor 180, are adapted to operate at a pressure and temperature such that the pentane-hexane solvent is at or above the boiling point or the bubble point, as the case may be.

In an embodiment disclosed, the pentane-hexane solvent and steam are provided to the reservoir concurrently, sequentially, cyclically, or combinations thereof.

In the preceding description, for purposes of explanation, numerous details are set forth in order to provide a thorough understanding of the embodiments. However, it will be apparent to one skilled in the art that these specific details are not required. In other instances, well-known structures and components are shown in block diagram form in order not to obscure the understanding.

The above-described embodiments are intended to be examples only. Alterations, modifications and variations can be effected to the particular embodiments by those of skill in the art without departing from the scope, which is defined solely by the claims appended hereto.

What is claimed is:

1. A method of recovering heavy oil or bitumen from a reservoir under a gravity-dominated recovery process comprising:

fractionating a diluent comprising pentane and hexane into fractions comprising a pentane-hexane fraction and an abridged diluent fraction;

preparing a pentane-hexane solvent comprising the pentane-hexane fraction;

injecting the pentane-hexane solvent into the reservoir as part of the gravity-dominated recovery process;

producing heavy oil or bitumen and recovered pentane-hexane solvent from the reservoir, said heavy oil or bitumen and said recovered pentane-hexane solvent together comprising a produced heavy oil or bitumen blend; and combining the abridged diluent fraction and the produced heavy oil or bitumen blend to provide a blended oil.

2. The method of claim 1, wherein the fractionating additionally provides a light ends fraction.

3. The method of claim 2, wherein the light ends fraction and the pentane-hexane fraction are combined to provide the pentane-hexane solvent.

4. The method of claim 1, further comprising collecting hydrocarbons containing pentanes and hexanes from the heavy oil or bitumen to provide the pentane-hexane solvent.

5. The method of claim 4, wherein the hydrocarbons are collected from a blended oil tank, containing heavy oil or bitumen.

6. The method of claim 4, wherein the hydrocarbons are collected from an emulsion treater.

7. The method of claim 1, wherein the pentane-hexane solvent is injected with steam.

8. The method of claim 7, wherein the pentane-hexane solvent is between 2 wt % and 20 wt % of the steam.

9. The method of claim 7, wherein the pentane-hexane solvent is greater than 50 percent pentane or hexane or mixtures thereof.

10. The method of claim 9, wherein at least 50 percent of the injected pentane or hexane or mixtures thereof is recovered in the heavy oil or bitumen and said recovered pentane-hexane solvent.

11. The method of claim 9, wherein the pentane-hexane solvent is greater than 80 percent pentane or hexane or mixtures thereof.

12. The method of claim 11, wherein at least 80 percent of the injected pentane or hexane or mixtures thereof is recovered in the heavy oil or bitumen and said recovered pentane-hexane solvent.

* * * * *